Dec. 5, 1972 W. T. GRUBB 3,705,089
REFERENCE ELECTRODE HALF CELL
Filed Sept. 28, 1970
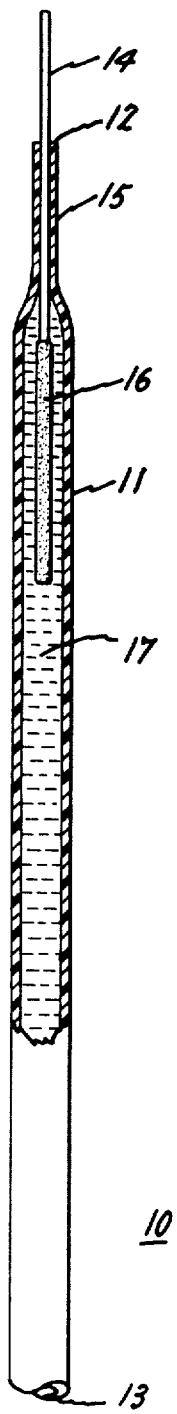
Inventor:
Willard T. Grubb,
by Paul R. Webb, II
His Attorney.

United States Patent Office 3,705,089
Patented Dec. 5, 1972

3,705,089
REFERENCE ELECTRODE HALF CELL
Willard T. Grubb, Schenectady, N.Y., assignor to
General Electric Company
Filed Sept. 28, 1970, Ser. No. 75,866
Int. Cl. G01n 27/30
U.S. Cl. 204—195 F         5 Claims

ABSTRACT OF THE DISCLOSURE

A reference electrode half cell has an elongated, flexible electrically insulated tube having opposite open ends, a silver wire positioned partially within the tube at one end thereof and extending outwardly from the one end, the tube bonded to the silver wire at the one end, a coating of silver chloride on a portion of the silver wire positioned within the tube, and at least one gelled equitransferent salt solution filling the tube in contact with the silver chloride coating on the silver wire and in contact with the opposite open end of the tube.

---

This invention relates to reference electrode half cells and, more particularly, to such half cells with at least one gelled equitransferent salt solution.

In electrochemical measurements, a reference electrode is employed in conjunction wtih a measuring or sensing electrode, such as a glass electrode, with both electrodes immersed in a solution, whereby the potential difference between the two electrodes is a function of the concentration of a specific ion in the solution. An example is the pH sensor used for measuring hydrogen ion concentrations of solutions. A reference electrode half cell includes generally a glass tube containing a reference electrode, a salt solution known as a salt bridge within the tube, and electrical connection by a liquid contact between the salt solution and the test sample in the form of a passage or aperture in the tube known as a liquid junction. The salt solution is generally selected so that its positive and negative ions are of approximately equal mobility. A solution of such a salt is known as an equitransferent salt solution. Such a unit is sometimes referred to as a half cell or a reference electrode. In the present application, such a unit is referred to as a reference electrode half cell.

The present invention is directed to an improved reference electrode half cell which is rugged, and can be miniaturized.

The primary objects of my invention are to provide a flexible reference electrode half cell in which the liquid junction can be renewed readily.

In accordance with one aspect of my invention, a reference electrode half cell has an elongated, flexible, electrically insulated tube having opposite open ends, a silver wire positioned partially within the tube at one end thereof and extending outwardly from the one end, the tube bonded to the silver wire at the one end, a coating of silver chloride on the portion of the silver wire positioned within the tube, and at least one gelled equitransferent salt solution filling the tube in contact with the silver chloride coating on the silver wire and in contact with the opposite open end of the tube.

These and various other objects, features and advantages of the invention will be better understood from the following description taken in connection with the accompanying drawing in which:

The single figure is a section view of a reference electrode half cell made in accordance with my invention.

In the single figure of the drawing, there is shown generally at 10 a reference electrode half cell embodying my invention. Reference electrode half cell 10 is in the form of a heat shrinkable polyolefin tube 11 with opposite ends 12 and 13. A silver wire 14 is positioned partially with tube 11 at its end 12 and extends outwardly from end 12. Tube 11 is bonded as at 15 to wire 14 adjacent end 12. At least a portion of silver wire 14 within tube 11 has a coating 16 of silver chloride thereon. Silver wire 14 with a coating 16 of silver chloride on a portion of its surface provides the reference electrode structure. At least one gelled equitransferent salt solution 17 fills the interior of tube 11. Gelled salt solution 17 is in contact with silver chloride coating 16 and in contact with the opposite open end 13 of tube 11. Open end 13 with gelled salt solution 17 in contact therewith forms a unique liquid contact for the reference electrode half cell.

I found that I could form an improved reference electrode half cell which was rugged, flexible and could be miniaturized. Further, I found that I could provide a unique liquid junction which could be renewed readily by cutting off a small segment of the tube at its open end. This improvement is opposed to the prior art wherein the liquid junction must be flushed after use or if a porous plug is employed at such a junction it must be removed and cleaned after use.

My improved reference electrode half cell can be formed by employing an elongated piece of a polyolefin tube such as a polyethylene tube. The tube is filled in one method by a syringe with a gelled equitransferent salt solution, such as a gelled potassium chloride solution. A silver wire which is chlorided over a portion from end thereof is positioned in one end of tube so that the silver chloride portion of the wire is within the tube. The tube is then bonded to the silver wire which extends outwardly from the end of the tube. I found it preferable to employ a heat shrinkable polyolefin tube whereby the bonding to the wire is accomplished easily by heating one end portion of the tube. The gelled salt solution is in contact also with the opposite open end of the tube thereby forming a liquid contact. A wide variety of polyolefin tubing can be employed which in elongated form provides a flexible structure. I prefer a heat shrinkable polyolefin tube of polyethylene. The gelled equitransferent salt solution must not flow under gravity during use but can be introduced initially into the tube as a liquid at elevated temperature or as a gel forced into the tube under pressure. At least one such gelled salt solution is employed. Generally the salt solution is potassium chloride solution. However, a second gelled equitransferent salt solution can be introduced into the tube after the first gelled salt solution of potassium chloride whereby the second gelled salt solution will be in contact with the open end of the tube. For example, a second gelled salt solution of potassium nitrate or lithium trichloroacetate can be used whereby either chloride ions or potassium ions are kept out of the sample and can be measured by the half cell in association with a chloride ion or potassium ion sensing electrode.

A variety of gelling agents can be employed to produce the gelled equitransferent salt solutions. One preferred gelling agent is Carbopol polyacrylic acid gelling agents manufactured by B. F. Goodrich Chemical Company, 3135 Euclid Avenue, Cleveland, Ohio. These gelling agents are neutralized wtih sodium hydroxide to provide the respective salt. The neutralized gelling agent was added to the equitransferent salt solution to produce the gelled salt solution.

Other suitable gelling agents include the polymers of acrylic acid, carboxy polymethylene, carboxymethyl cellulose, methyl cellulose, algin, agar, polyethylene oxide, polyvinyl alcohol, and mixtures thereof.

In an illustrative operation of my reference electrode half cell, the half cell is assembled as above described using a gelled potassium chloride salt solution. An associated hydrogen ion measuring electrode or half cell is placed in a solution into which is placed the open end of the half cell tube. The potential difference between the two electrodes is a function of the concentration of the hydrogen ion in the solution.

Examples of reference electrode half cells made in accordance with my invention are set forth below:

EXAMPLE 1

A reference electrode half cell was made in accordance with my invention as described above and as shown in the single figure of the drawing by employing a one foot long heat shrinkable polyolefin tube of polyethylene. The tube had an internal diameter of 0.060 inch and an outside diameter of 0.080 inch. A gelled salt solution was prepared by using a Carbopol polyacrylic gelling agent which had been neutralized with sodium hydroxide. Four percent by weight of this neutralized salt of the gelling agent was added to 1 N potassium chloride solution in water to produce a gelled one normal potassium chloride solution which did not flow under gravity.

The tube was filled with the gelled salt solution by using a hypodermic syringe. A reference electrode consisting of silver wire which had a coating of silver chloride adjacent one end thereof was inserted in one end of the tube so that the silver chloride coating portion of the wire was within the tube and the silver wire portion extended outwardly from the tube. Heat was applied to the end of the tube containing the reference electrode whereby because of the heat shrinkability of the tube it was bonded directly to the reference electrode. The gelled salt solution was in contact with the opposite open end of the tube thereby providing a liquid junction. The resulting structure was a reference electrode half cell made in accordance with my invention.

EXAMPLE 2

A commercial silver-silver chloride electrode half cell containing saturated potassium chloride and a reference electrode half cell made as above in Example 1 were measured in the same phosphate buffer solution which had a pH of 7.0. The commercial electrode exhibited a voltage of −32.2 mv. against the reference electrode half cell of my invention. The difference in voltage reflected approximately the expected difference between silver chloride electrodes in saturated potassium chloride and one normal potassium chloride.

EXAMPLE 3

A reference electrode half cell was made in accordance with my invention as described above and as shown in the single figure of the drawing.

Two grams of agar was dissolved in 150 ml. of distilled water at about 80° C., and 33.6 grams of KCl was dissolved in this solution. A polyolefin heat shrinkable tube was attached on one end to a low vacuum and the other end dipped in the above solution. The tube was rapidly filled by suction with the KCl solution containing agar. Upon cooling to room temperature, the agar and KCl solution became a non-flowing gel. A chlorided silver wire was sealed into one end of the tube as in Example 1. The electrode thus obtained was a silver-silver chloride 3 N KCl electrode. Its potential was +5.5 mv. against a commercial silver chloride saturated KCl reference electrode. This voltage was stable within less than one millivolt for at least 24 hours.

While other modifications of the invention and variations thereof which may be embraced within the scope of the invention have not been described, the invention is intended to include such as may be embraced within the following claims.

What I claim as new and desire to secure by Letters Patent of the United States is:

1. A reference electrode half cell comprises an elongated tube of electrically insulating material, a silver wire positioned partially within the tube bonded to one end thereof and extending outwardly from said one end, a coating of silver chloride on a portion of the silver wire positioned within the tube, and at least one gelled equitransferent salt solution filling the tube and being in contact with the silver chloride coating on the silver wire and with the opposite, open end of the tube said tube being flexible throughout its length from said one end to said open end.

2. A reference electrode half cell as in claim 1, in which the gelled salt solution is gelled potassium chloride solution.

3. A reference electrode half cell as in claim 1 in which the gelled salt solutions filing the tube are gelled potassium chloride solution in contact with the silver chloride coating of the silver wire and gelled potassium nitrate solution in contact with the gelled potassium chloride solution and with the open end of the tube.

4. A reference electrode half cell as in claim 1, in which the gelled salt solutions filling the tube are gelled potassium chloride solution in contact with the silver chloride coating of the silver wire and gelled lithium trichloroacetate solution in contact with the gelled potassium chloride solution and with the open end of the tube.

5. A reference electrode half cell as in claim 1, in which the electrically insulating material is heat shrinkable polyethylene, and the gelled salt solution is gelled potassium chloride solution.

References Cited

UNITED STATES PATENTS

| | | | |
|---|---|---|---|
| 2,183,531 | 12/1939 | Allison | 204—195 F |
| 3,103,480 | 9/1963 | Watanabe et al. | 204—195 F |
| 3,463,717 | 8/1969 | Koopman et al. | 204—195 F |
| 3,575,834 | 4/1971 | Hoole et al. | 204—195 F |

TA-HSUNG TUNG, Primary Examiner